United States Patent
Otsuka et al.

(10) Patent No.: US 8,433,499 B2
(45) Date of Patent: Apr. 30, 2013

(54) APPARATUS FOR DETECTING IMBALANCE ABNORMALITY IN AIR-FUEL RATIO BETWEEN CYLINDERS

(75) Inventors: Takayuki Otsuka, Susono (JP); Yasuyuki Irisawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/376,701

(22) PCT Filed: Nov. 1, 2010

(86) PCT No.: PCT/JP2010/006441
§ 371 (c)(1),
(2), (4) Date: Dec. 7, 2011

(87) PCT Pub. No.: WO2012/059953
PCT Pub. Date: May 10, 2012

(65) Prior Publication Data
US 2012/0283931 A1 Nov. 8, 2012

(51) Int. Cl.
*F02D 23/00* (2006.01)
*F02D 41/26* (2006.01)
*F02D 13/02* (2006.01)
*G06F 17/00* (2006.01)

(52) U.S. Cl.
USPC ............................................ 701/103; 60/602

(58) Field of Classification Search .................. 701/103; 60/612, 602; 123/198 F
See application file for complete search history.

(56) References Cited

U.S. PATENT DOCUMENTS

| 7,480,557 B2 | 1/2009 | Yamaguchi et al. | |
|---|---|---|---|
| 8,001,782 B2 * | 8/2011 | Pursifull | 60/612 |
| 2010/0017098 A1 | 1/2010 | Fukuchi et al. | |

FOREIGN PATENT DOCUMENTS

| JP | 2008 144754 | 6/2008 |
|---|---|---|
| JP | 2009 209747 | 9/2009 |
| JP | 2010 24977 | 2/2010 |
| JP | 2010 53825 | 3/2010 |

OTHER PUBLICATIONS

International Search Report Issued Nov. 30, 2010 in PCT/JP10/06441 Filed Nov. 1, 2010.

* cited by examiner

*Primary Examiner* — Hieu T Vo
(74) *Attorney, Agent, or Firm* — Oblon, Spivak, McClelland, Maier & Neustadt, L.L.P.

(57) ABSTRACT

An apparatus for detecting imbalance abnormality in an air-fuel ratio between cylinders in a multi-cylinder internal combustion engine comprises a turbocharger, a bypass passage, a waist gate valve, an air-fuel ratio sensor, and a stepless transmission. The imbalance abnormality is detected based upon a variation degree in output of the air-fuel ratio sensor. The internal combustion engine and the stepless transmission are controlled in such a manner that an actual operating point of the internal combustion engine moves on a predetermined operating line in a coordinate system defined by an engine rotational speed and engine torque. The operating line is changed in such a manner that, when the actual operating point is outside of a waist gate valve opening region at the time of detecting the imbalance abnormality, the actual operating point moves into the waist gate valve opening region.

8 Claims, 13 Drawing Sheets

APPARATUS FOR DETECTING IMBALANCE ABNORMALITY IN AIR-FUEL RATIO BETWEEN CYLINDERS

TECHNICAL FIELD

The present invention relates to an apparatus for detecting imbalance abnormality in an air-fuel ratio between cylinders, and particularly, to an apparatus for detecting that an air-fuel ratio between cylinders relatively largely varies in a multi-cylinder internal combustion engine.

BACKGROUND ART

In an internal combustion engine equipped with an exhaust purifying apparatus using a catalyst, harmful substances in an exhaust gas are generally purified by the catalyst in a highly efficient manner. Therefore, it is fundamental to control a mixing ratio of air and fuel in a mixture to be burned in the internal combustion engine, that is, an air-fuel ratio. For controlling such an air-fuel ratio, an air-fuel ratio sensor is provided in an exhaust passage in the internal combustion engine, and feedback control is performed in such a manner as to make the air-fuel ratio detected by the air-fuel ratio sensor be equal to a predetermined target air-fuel ratio.

On the other hand, in an internal combustion engine having a plurality of cylinders, that is, a multi-cylinder type internal combustion engine, since air-fuel ratio control is usually performed applying the same control amount to all the cylinders, there are some cases where an actual air-fuel ratio varies between cylinders even if the air-fuel ratio control is performed. When a degree of the variation is small at this time, since the variation can be absorbed by air-fuel ratio feedback control and the harmful substances in the exhaust gas can be purified also in the catalyst, the variation has no adverse influence on exhaust emissions and raises no particular problem.

However, when the air-fuel ratio varies largely between the cylinders due to a failure of a fuel injection system in a part of the cylinders, the exhaust emission is deteriorated, thus raising the problem. It is desired to detect the imbalance in the air-fuel ratio as large as to thus deteriorate the exhaust emission, as abnormality. Particularly in a case of an internal combustion engine for an automobile, for beforehand preventing a travel of a vehicle in which the exhaust emission has deteriorated, it is requested to detect the imbalance abnormality in the air-fuel ratio between the cylinders on board, and there is recently the movement of legalizing such detection of the imbalance abnormality on board.

For example, an apparatus described in PTL 1 detects a parameter in regard to an imbalance in an air-fuel ratio between cylinders and corrects output of an air-fuel ratio sensor based upon the detected parameter.

When imbalance abnormality in the air-fuel ratio occurs, variations in output of the air-fuel ratio sensor become large. Therefore, by monitoring a degree of the variation, it is possible to detect the imbalance abnormality in the air-fuel ratio.

However, in a case of a turbocharged internal combustion engine equipped with a turbocharger, since an exhaust gas is stirred at the time it passes through a turbine, air-fuel ratios in the respective cylinders are averaged and variations in the output in the air-fuel ratio sensor are reduced to be small. Therefore, there is the possibility that the imbalance abnormality in the air-fuel ratio can not be accurately detected.

In addition, in a case of the turbocharged internal combustion engine, in some cases there occurs scavenging that intake air blows out to the exhaust side at valve overlapping. When the scavenging occurs, a new gas is mixed into a pure exhaust gas from each cylinder to change an air-fuel ratio, so that there is the possibility that the imbalance abnormality in the air-fuel ratio can not be accurately detected.

Therefore, the present invention is made in view of the foregoing problem and an object of the present invention is to provide an apparatus for detecting imbalance abnormality in an air-fuel ratio between cylinders which can solve problems specific in a turbocharged internal combustion engine.

CITATION LIST

Patent Literature

PTL 1: Japanese Patent Laid-Open No. 2009-209747

SUMMARY OF INVENTION

According to one aspect of the present invention, there is provided an apparatus for detecting imbalance abnormality in an air-fuel ratio between cylinders comprising a turbine of a turbocharger disposed in an exhaust passage in a multi-cylinder internal combustion engine, a waist gate valve for opening/closing a bypass passage bypassing the turbine, an air-fuel ratio sensor disposed in the exhaust passage downstream of an outlet of the bypass passage, abnormality detecting means for detecting imbalance abnormality in an air-fuel ratio between cylinders based upon a variation degree in output of the air-fuel ratio sensor, a stepless transmission connected to the internal combustion engine, control means for controlling the internal combustion engine and the stepless transmission in such a manner that an actual operation point of the internal combustion engine moves on a predetermined operation line in a coordinate system defined by an engine rotational speed and engine torque, and changing means for changing the operation line in such a manner that, when the actual operation point is outside of a waist gate valve opening region in the coordinate system at the time of detecting the imbalance abnormality, the actual operation point moves into the waist gate valve opening region.

Preferably the changing means changes the operation line in such a manner that the actual operation point moves into the waist gate valve opening region on the same equal output line in the coordinate system.

Preferably the operation line is a fuel consumption optimum line in which the fuel consumption is optimal.

According to another aspect of the present invention, there is provided an apparatus for detecting imbalance abnormality in an air-fuel ratio between cylinders comprising a turbine of a turbocharger disposed in an exhaust passage in a multi-cylinder internal combustion, an air-fuel ratio sensor disposed in the exhaust passage downstream of the turbine, abnormality detecting means for detecting imbalance abnormality in an air-fuel ratio between cylinders based upon a variation degree in output of the air-fuel ratio sensor, a stepless transmission connected to the internal combustion engine, control means for controlling the internal combustion engine and the stepless transmission in such a manner that an actual operating point of the internal combustion engine moves on a predetermined operation line in a coordinate system defined by an engine rotational speed and engine torque, and changing means for changing the operation line in such a manner that, when the actual operation point is within a scavenging region in the coordinate system at the time of detecting the imbalance abnormality, the actual operation point moves out of the scavenging region.

Preferably the changing means changes the operation line in such a manner that the actual operation point moves out of the scavenging region on the same equal output line in the coordinate system.

According to a further aspect of the present invention, there is provided an apparatus for detecting imbalance abnormality in an air-fuel ratio between cylinders comprising a turbine of a turbocharger disposed in an exhaust passage in a multi-cylinder internal combustion engine, an air-fuel ratio sensor disposed in the exhaust passage downstream of the turbine, abnormality detecting means for detecting imbalance abnormality in an air-fuel ratio between cylinders based upon a variation degree in output of the air-fuel ratio sensor, a stepless transmission connected to the internal combustion engine, control means for controlling the internal combustion engine and the stepless transmission in such a manner that an actual operation point of the internal combustion engine moves on a predetermined operation line in a coordinate system defined by an engine rotational speed and engine torque, and changing means for changing valve timing in such a manner that valve overlap between an intake valve and an exhaust valve is prohibited when the actual operation point is within a scavenging region in the coordinate system at the time of detecting the imbalance abnormality.

Preferably the abnormality detecting means detects the imbalance abnormality based upon a value of a parameter correlating with a variation degree in the output of the air-fuel ratio sensor, and the parameter is a value based upon a difference in the output of the air-fuel ratio sensor between two different timings.

Preferably the air-fuel ratio sensor is disposed in a collector, in which exhaust gases of the respective cylinders collect, in the exhaust passage.

According to the present invention, an excellent effect of being capable of providing an apparatus of detecting imbalance abnormality in an air-fuel ratio between cylinders, which can solve the problem specific in the turbocharged internal combustion engine, can be achieved.

DESCRIPTION OF EMBODIMENTS

Hereinafter, embodiments in the present invention will be explained with reference to the accompanying drawings.

Figure 1:
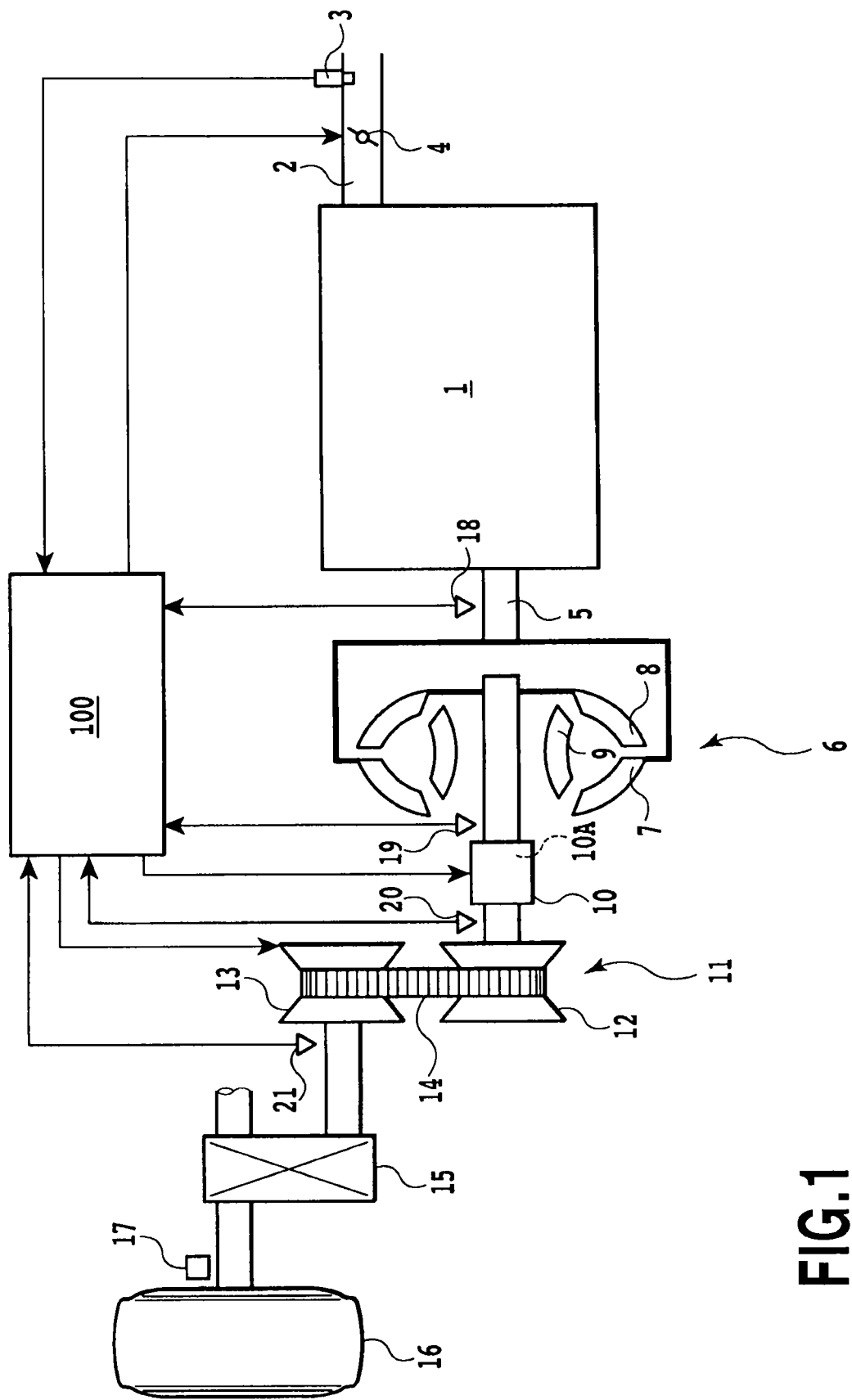
FIG. 1 is a diagram schematically showing a driving system of a vehicle according to an embodiment in the present invention.

FIG. 1 is a diagram schematically showing a driving system of a vehicle according to an embodiment in the present invention. At 1 is indicated an internal combustion engine (engine) mounted on a vehicle. The engine 1 is a multi-cylinder internal combustion engine, particularly a spark ignition type internal combustion engine of in-line four cylinders. An air flow meter 3 and a throttle valve 4 are provided in an intake passage 2 of the engine 1. The air flow meter 3 serves to detect a quantity of air aspired into the engine 1 per unit time, that is, an intake air quantity. The throttle valve 4 is of an electronically controlled type and adjusts an intake air quantity by the opening/closing thereof.

A torque converter (T/C) 6 is coupled to a crank shaft 5 of the engine 1. The T/C 6 includes an input-side pump impeller 7 connected to the crankshaft 5, an output-side turbine runner 8 opposite to the pump impeller 7, and a stator 9.

An automatic transmission is connected to the turbine runner 8. The automatic transmission in the present embodiment is composed of a belt type stepless transmission, that is, a CVT (continuously variable transmission) 11. The CVT 11 is provided with an input-side primary pulley 12, an output-side secondary pulley 13, and a metallic belt 14 wound around and between the pulleys 12 and 13. In this manner, the vehicle is constructed as an automatic vehicle which can automatically change gears continuously. The CVT 11 is connected mechanically to the engine 1 via the T/C 6.

The CVT 11 is provided with a switching mechanism 10 closer to an input side than the primary pulley 12. The switching mechanism 10 includes a clutch 10a switching presence/absence of transmission of rotation or power outputted from the T/C 6, and a reverse mechanism which reverses the rotation or power, which will be transmitted to the CVT 11. The CVT 11 includes a parking lock mechanism for locking any one of the pulleys at parking.

A drive wheel 16 is connected via a differential gear 15 to the secondary pulley 13. Brakes 17 are attached to the drive wheel 16 and a driven wheel (not shown) for braking.

An electronic control unit (ECU) 100 is provided in the vehicle. The ECU 100 includes a CPU, a ROM, a RAM, input/output ports, a memory device, and the like.

A detection signal representative of an intake air quantity is sent to the ECU 100 from the air flow meter 3. A detection signal representative of a rotational angle (crank angle) of the crank shaft 5 is sent to the ECU 100 from a crank angle sensor 18. The ECU 100 detects a crank angle of the engine 1 based upon the above signal and calculates a revolution number of the engine 1. Here, "revolution number" means a rotational speed per unit time and is the same as a rotational speed. In the present embodiment, the rotational speed means a revolution number rpm per one minute.

A detection signal representative of a turbine rotational speed, that is, an output rotational speed of the T/C 6 is sent to the ECU 100 from a turbine rotational speed sensor 19. Similarly, detection signals representative of a CVT input rotational speed and a CVT output rotational speed are sent to the ECU 110 from a CVT input rotational speed sensor 20 and a CVT output rotational speed sensor 21 respectively.

The ECU 100 sends a control signal to a drive motor of the throttle valve 4 to control an opening degree of the throttle valve 4 (throttle opening degree). The ECU 100 receives a detection signal representative of an actual throttle opening degree from a throttle opening degree sensor (not shown) provided in the throttle valve 4.

The ECU 100 controls a hydraulic pressure to be supplied to a hydraulic mechanism in the primary pulley 12 to control a gear ratio of the CVT 11.

Figure 2:
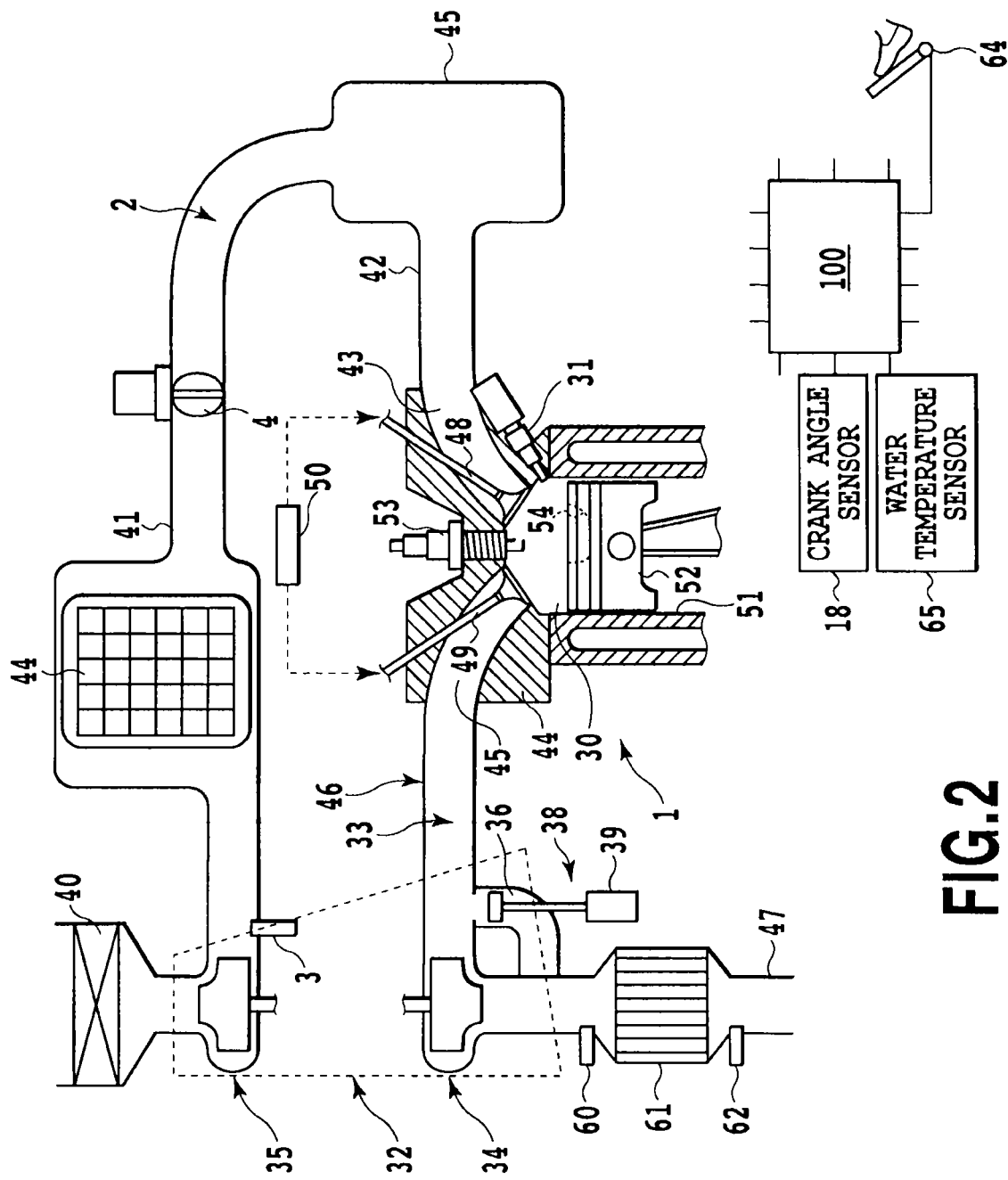
FIG. 2 is a schematic diagram of an internal combustion engine according to the present embodiment.

FIG. 2 schematically shows the engine according to the present embodiment. The engine 1 is provided with an injector (fuel injection valve) for directly injecting fuel into an in-cylinder chamber 30 for each cylinder.

The engine 1 is provided with a turbocharger 32 as a supercharger. The turbocharger 32 includes a turbine 34 provided in an exhaust passage 33 and a compressor 35 provided in the intake passage 2, wherein the turbocharger 32 uses energy of an exhaust gas flowing in the exhaust passage 33 to drive the turbine 34 and drive the compressor 35 coaxially connected to the turbine 34, thus supercharging intake air in the intake passage 2. For preventing excessive supercharging, a bypass passage 36 bypassing the turbine 34 is provided in the exhaust passage 33, and a waist gate valve (WGV) 38 for opening/closing the bypass passage 36 is provided therein. The WGV 38 includes an actuator 39 for the opening/closing thereof.

Air aspired from an air cleaner 40 is distributed and supplied to the combustion chamber 30 of each cylinder via the intake passage 2. The intake passage 2 is defined mainly by an intake conduit 41, an intake manifold 42, and intake ports 43, which are arranged in that order from upstream. The compressor 35, an intercooler 44 disposed downstream of the compressor 35, and the throttle valve 4 disposed downstream of the intercooler 44 are provided in the intake conduit 41. The intercooler 44 cools intake air passing therethrough. The intercooler 44 in the present embodiment is of an air cooled type, but may be of a water cooled type. The engine 1 in the present embodiment is mounted on a vehicle, wherein intake air makes heat exchange with outside air (particularly with running wind) to be cooled. The intake manifold 42 has an upstream end connected to a surge tank 45 as a collector and branch conduits as downstream branch passages thereof each connected to the intake port 43 of each cylinder. The intake port 43 is formed in a cylinder head 44 of the engine 1 for each cylinder.

The exhaust passage 33 is defined mainly by exhaust ports 45 formed in the cylinder head 44 in the engine 1 for the respective cylinders, an exhaust manifold 46 connected to the exhaust ports 45, and an exhaust conduit 47 positioned downstream of the exhaust manifold 46. The exhaust turbine 34 is interposed between the exhaust manifold 46 and the exhaust conduit 47.

An outlet of the intake port 43 is opened/closed by an intake valve 48 and an inlet of the exhaust port 45 is opened/closed by an exhaust valve 49. The intake valve 48 and the exhaust valve 49 respectively are independently opened/closed by a cam shaft (not shown). For varying valve timing of at least one of the intake valve 48 and the exhaust valve 49, a valve timing variable mechanism (VVT) 50 is provided.

A piston 52 is reciprocally arranged in a cylinder 51 of the engine 1, and the in-cylinder combustion chamber 30 is defined above the piston 52. An ignition plug 53 is attached to the cylinder head 44 to be exposed to the in-cylinder combustion chamber 30.

An injector 31 injects fuel during either one or both of an intake stroke and a compression stroke. In a case of the injection during the compression stroke, fuel is injected toward a concave portion 54 formed on a top portion of the ascending piston 52 and the fuel and air are mixed in the process of generating a tumble-shaped flow swirling up along an inner surface of the concave portion 54, thus forming a relatively rich mixture layer in the vicinity of the ignition plug 53. A lean mixture layer or an air layer is formed in the periphery of the rich mixture layer to stratify the mixture in the in-cylinder combustion chamber 30, thus achieving the stratified combustion. The injector 31 opens based upon a valve-opening signal from the ECU 100 to inject fuel and closes when the valve-opening signal from the ECU 100 stops, thus stopping the fuel injection. The mixture in the in-cylinder combustion chamber 30 is ignited based upon an ignition signal from the ECU 100 by the ignition plug 53 for combustion. The exhaust gas in the in-cylinder combustion chamber 30 is discharged through the exhaust passage 33.

It should be noted that the engine in the present embodiment is of an in-cylinder injection type or a direct injection type, but is not limited thereto, for example, may be of an intake passage injection type (particularly a port injection type) or a dual injection type having both injection types. Although not illustrated, fuel in the fuel tank is supplied via a fuel supply apparatus (not shown) to the injector 31.

The exhaust manifold 46 is composed of branch conduits for the respective cylinders constructing the upstream portions and an exhaust collector constructing the downstream portion. The turbine 34 is connected to the downstream end of the exhaust collector. A portion from the exhaust collector to the downstream side of the exhaust manifold 46 among the exhaust passage 33 forms a collector in which exhaust gases of the respective cylinders collect.

A first air-fuel ratio sensor 60 for detecting an air-fuel ratio of an exhaust gas, a catalyst 61 composed of a three-way catalyst, and a second air-fuel ratio sensor 62 for likewise detecting an air-fuel ratio of an exhaust gas are serially provided in the exhaust passage 33 downstream of the turbine 34, particularly downstream of the outlet of the bypass passage 36 in that order from upstream. Hereinafter, the first and second air-fuel ratio sensors are called a pre-catalyst sensor and a post-catalyst sensor. The pre-catalyst sensor 60 and the post-catalyst sensor 62 are respectively disposed to be positioned right before and after the catalyst 61 to detect an air-fuel ratio based upon an oxygen concentration in the exhaust gas. In this way, the single pre-catalyst sensor 60 is disposed in the collector in the exhaust passage. The pre-catalyst sensor 60 corresponds to "an air-fuel ratio sensor" in the present invention. It should be noted that a catalyst composed of a three-way catalyst may be further provided downstream of the post-catalyst sensor 62.

The ECU 100 is provided with a microcomputer constructed including a CPU, a ROM, a RAM, an A/D converter, an input/output interface, and the like, and receives input signals from various types of sensors including the aforementioned respective sensors and executes predetermined processes based upon the input signals, thus controlling the injector 31, the ignition plug 53, the throttle valve 4, the VVT 50 and the like.

The aforementioned sensors include an accelerator opening degree sensor 64 for detecting an accelerator opening degree and a water temperature sensor 65 for detecting a cooling water temperature of the engine 1. The accelerator opening degree sensor 64 outputs a signal in response to an opening degree of an accelerator pedal operated by a driver of a vehicle to the ECU 100.

Figure 3:
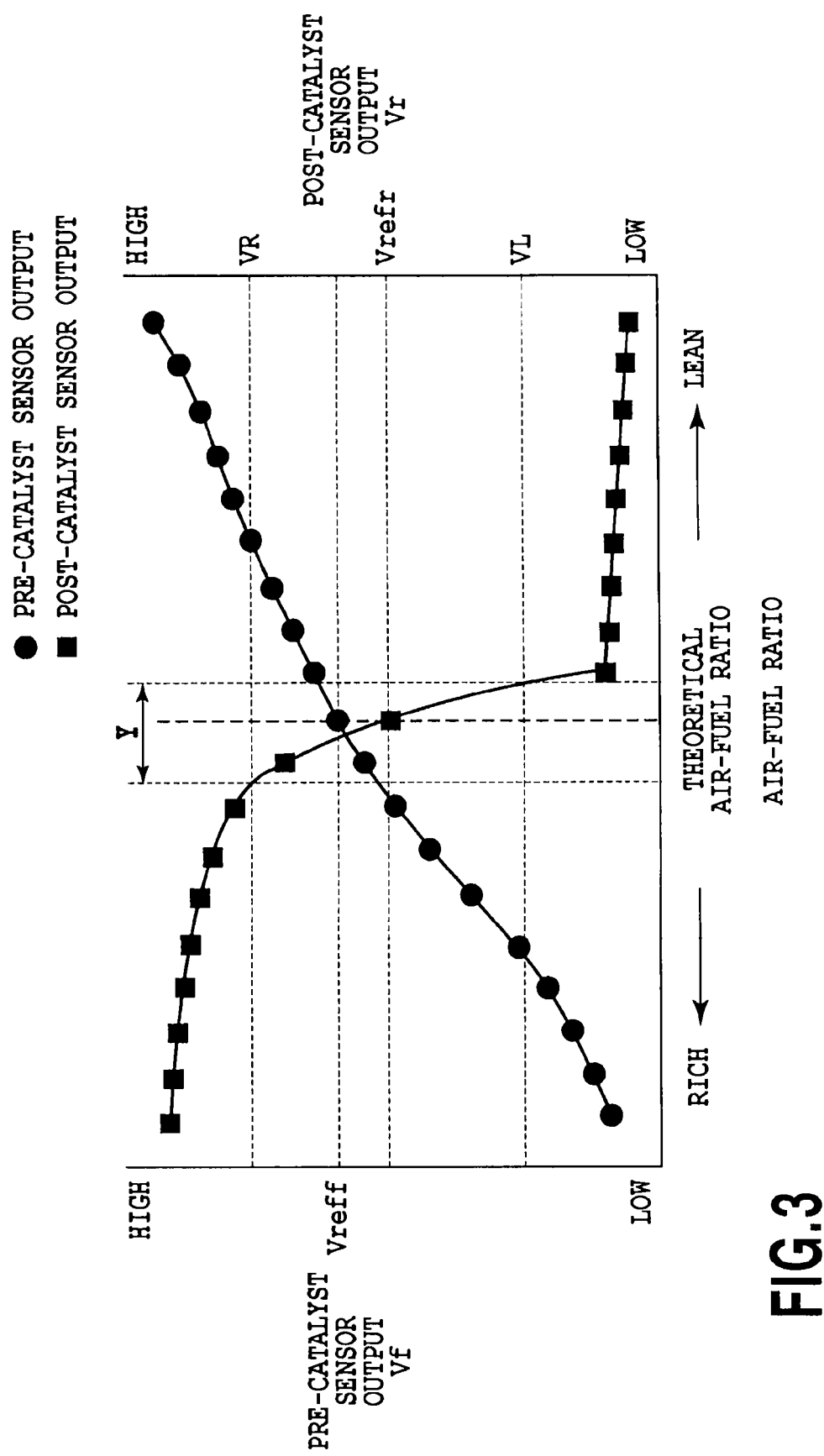
FIG. 3 is a graph showing output characteristics of a pre-catalyst sensor and a post-catalyst sensor.

The pre-catalyst sensor 60 is constructed of a so-called wide-range air-fuel ratio sensor, and can sequentially detect air-fuel ratios over a relatively wide range. FIG. 3 shows output characteristics of the pre-catalyst sensor 60. As shown in the figure, the pre-catalyst sensor 60 outputs a voltage signal Vf of a magnitude in proportion to the detected exhaust air-fuel ratio (also called a pre-catalyst air-fuel ratio). When the exhaust air-fuel ratio is a stoichiometric air-fuel ratio (theoretical air-fuel ratio, for example, A/F=14.6), the output voltage is Vreff (for example, about 3.3V).

On the other hand, the post-catalyst sensor 62 is constructed of a so-called $O_2$ sensor, and has the characteristic that an output value rapidly changes across the stoichiometric air-fuel ratio. FIG. 3 shows output characteristics of the post-catalyst sensor 62. As shown in the figure, when the exhaust air-fuel ratio (post-catalyst air-fuel ratio A/Fr) is a stoichiometric air-fuel ratio, an output voltage thereof, that is, a stoichiometric air-fuel ratio corresponding value is Vrefr (for example, 0.45V). The output voltage of the post-catalyst sensor 62 changes within a predetermined range (for example, 0 to 1V). When the exhaust air-fuel ratio is leaner than the stoichiometric air-fuel ratio, the output voltage of the post-catalyst sensor is lower than the stoichimetric air-fuel ratio equivalent value Vrefr, and when the exhaust air-fuel ratio is richer than the stoichiometric air-fuel ratio, the output voltage of the post-catalyst sensor is higher than the stoichimetric air-fuel ratio equivalent value Vrefr.

The catalyst 11 simultaneously purifies NOx, HC and CO as harmful ingredients in the exhaust gas when an air-fuel ratio A/F in the exhaust gas flowing into the catalyst 11 is in the vicinity of a stoichiometric air-fuel ratio. A width (window) of the air-fuel ratio in which the three ingredients can be purified simultaneously with high efficiency is relatively narrow.

The air-fuel ratio feedback control (stoichiometric air-fuel ratio control) is performed by the ECU 20 in such a manner that the air-fuel ratio of the exhaust gas flowing into the catalyst 11 is controlled to be in the vicinity of a stoichiometric air-fuel ratio. The air-fuel ratio control is composed of main air-fuel ratio control (main air-fuel ratio feedback control) for making an exhaust air-fuel ratio detected by the pre-catalyst sensor 60 be equal to a stoichiometric air-fuel ratio as a predetermined target air-fuel ratio and assistant air-fuel ratio control (assistant air-fuel ratio feedback control) for making an exhaust air-fuel ratio detected by the post-catalyst sensor 62 be equal to a stoichiometric air-fuel ratio.

Incidentally it is assumed, for example, that the injector 12 disposed in a part of all the cylinders is out of order and an imbalance in an air-fuel ratio between cylinders occurs. For example, it is a case where a fuel injection quantity in a first cylinder is larger than in each of the other second, third and fourth cylinders and an air-fuel ratio of the first cylinder is shifted to be largely richer than in each of the other second, third and fourth cylinders. There are some cases where if a relatively large correction quantity is applied by the aforementioned main feedback control even at this time, an air-fuel ratio in the total of gases to be supplied to the pre-catalyst sensor 60 can be controlled to a stoichiomeric air-fuel ratio. However, in regard to the air-fuel ratio for each cylinder, the air-fuel ratio in the first cylinder is much larger than the stoichiomeric air-fuel ratio and the air-fuel ratio in each of in the second, third and fourth cylinders is leaner than the stoichiomeric air-fuel ratio. It is apparent that the air-fuel ratio of all the cylinders merely results in the stoichiomeric air-fuel ratio as a whole, which is not appropriate for exhaust emissions. Therefore, the present embodiment is provided with an apparatus for detecting such imbalance abnormality in an air-fuel ratio between cylinders.

Figure 4:
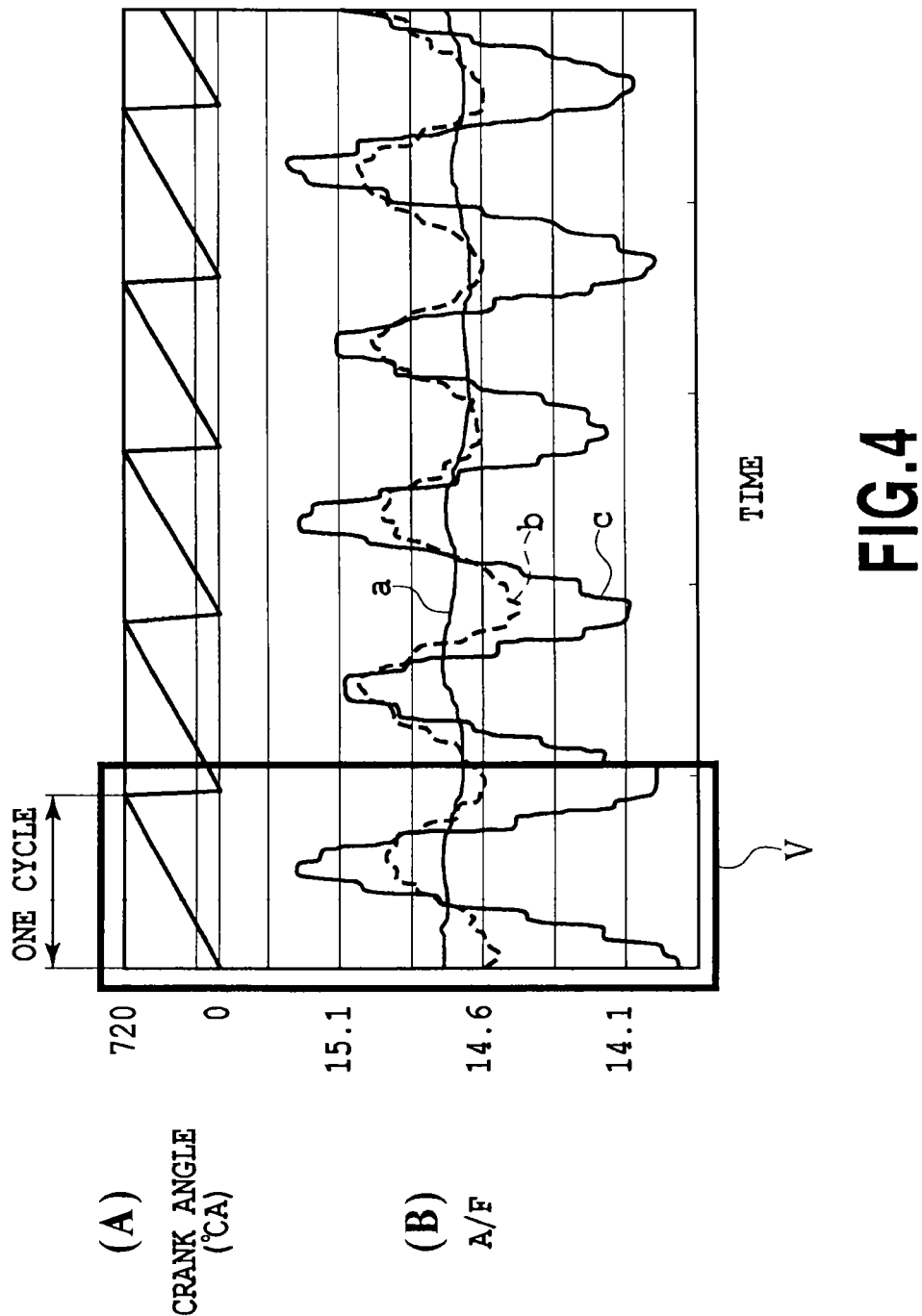
FIG. 4 is a graph showing variations in output in the air-fuel ratio sensor in accordance with an imbalance degree in an air-fuel ratio between cylinders.

As shown in FIG. 4, the exhaust air-fuel ratio detected by the pre-catalyst sensor 60 has a tendency of periodically varying in one engine cycle (=720° CA) as one cycle. When the imbalance in an air-fuel ratio between cylinders occurs, the variation within one engine cycle becomes large. Air-fuel ratio line diagrams a, b, and c of (B) respectively show a case of no imbalance, a case where only one cylinder is shifted to be rich in an imbalance rate of 20%, and a case where only one cylinder is shifted to be rich in an imbalance rate of 50%. As apparent from this, as the imbalance rate becomes larger, an amplitude of the air-fuel ratio variation becomes the larger.

Here, "imbalance rate (%)" is a parameter representative of an imbalance degree in an air-fuel ratio between cylinders. That is, the imbalance rate means a value on, in a case where a deviation in a fuel injection quantity occurs only in one cylinder among all the cylinders, to what degree a fuel injection quantity of the cylinder (imbalance cylinder) having occurrence of the fuel injection quantity deviation is deviated from a fuel injection quantity of the cylinder (balance cylinder) having no occurrence of the fuel injection quantity deviation, that is, from a reference injection quantity. When an imbalance rate is indicated at IB, a fuel injection quantity of an imbalance cylinder is indicated at Qib, and a fuel injection quantity of a balance cylinder, that is, a reference injection quantity is indicated at Qs, IB=(Qib−Qs)/Qs. As the imbalance rate IB is larger, the deviation in the fuel injection quantity of the imbalance cylinder to that of the balance cylinder is the larger, and the imbalance degree in the air-fuel ratio is the larger.

[Detection of Imbalance Abnormality in Air-Fuel Ratio Between Cylinders]

As understood from the above explanation, occurrence of the imbalance abnormality in the air-fuel ratio increases the variation in the output of the pre-catalyst sensor. Therefore, it is possible to detect the imbalance abnormality in the air-fuel ratio by monitoring the variation degree. In the present embodiment, a variation parameter as a parameter correlating with the output of the pre-catalyst sensor is calculated and the variation parameter is compared with a predetermined abnormality determination value to detect the imbalance abnormality.

Figure 5:
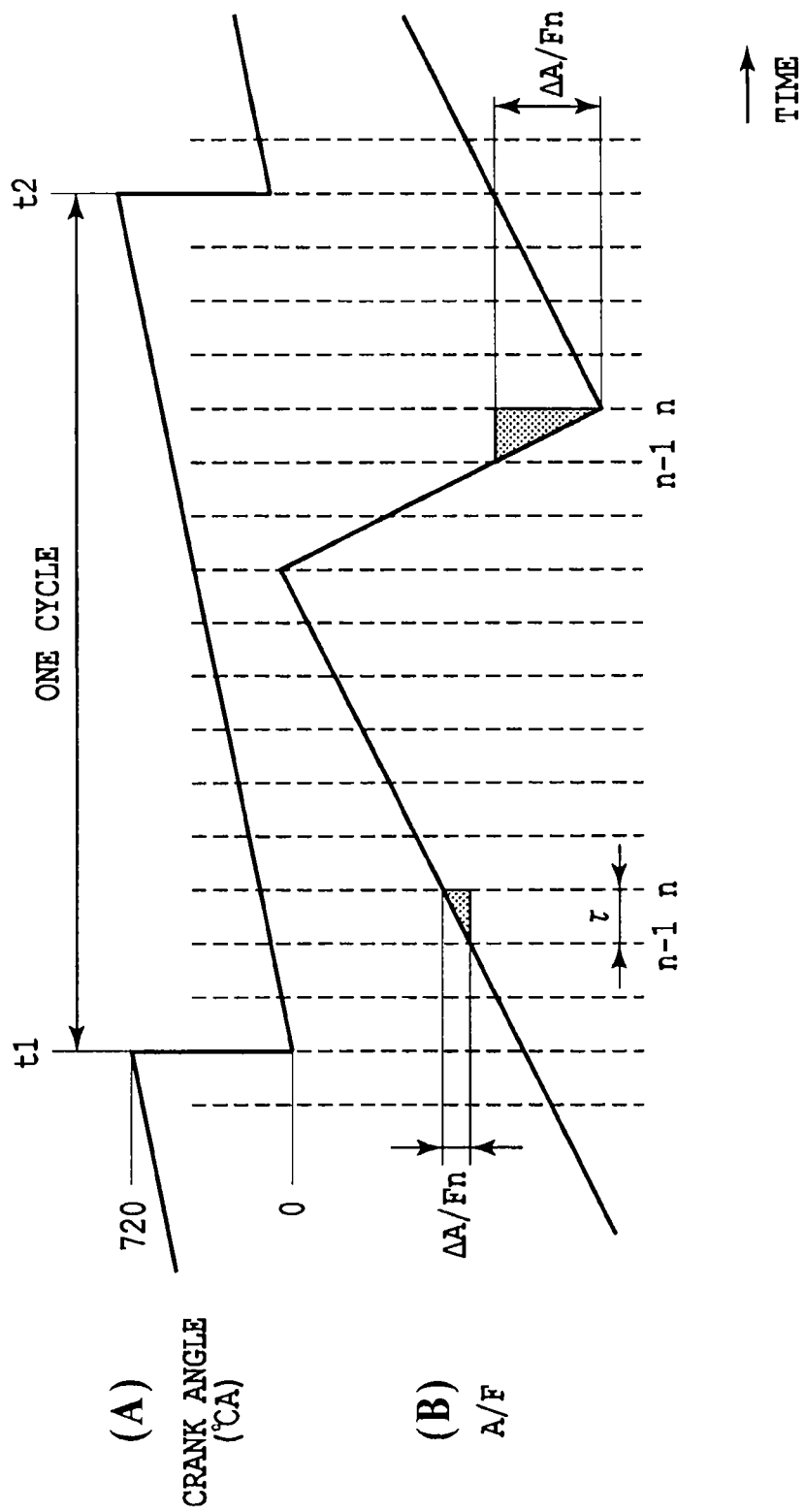
FIG. 5 is an enlarged diagram corresponding to a V-part in FIG. 4.

Here, an explanation will be made of a method of calculating the variation parameter. FIG. 5 is an enlarged diagram corresponding to a V-part in FIG. 4 and particularly shows variations in the output of the pre-catalyst sensor within one engine cycle. As the output of the pre-catalyst sensor, a value found by converting an output voltage Vf of the pre-catalyst sensor 60 into an air-fuel ratio A/F is used. However, it is also possible to directly use the output voltage of the pre-catalyst sensor 60.

As shown in (B) diagram, the ECU 20 obtains a value A/F in the output of the pre-catalyst sensor for each predetermined sample cycle τ (unit time, for example 4 ms) within one engine cycle. In addition, an absolute value of a difference $\Delta A/F_n$ between a value $A/F_n$ obtained at timing of this time and a value $A/F_{n-1}$ obtained at timing of the previous time is found according to the following formula (1). The difference $\Delta A/F_n$ can be restated as a differential value or an inclination of the timing of this time.

$$\Delta A/F_n = |A/F_n - A/F_{n-1}| \tag{1}$$

In the simplest manner, the difference $\Delta A/F_n$ expresses the variation in the output of the pre-catalyst sensor. This is because, as the variation degree is the larger, the inclination of the air-fuel ratio line diagram becomes the larger and the difference $\Delta A/F_n$ becomes the larger. Therefore, a value of the difference $\Delta A/F_n$ at a predetermined first timing can be defined as the variation parameter.

However, in the present embodiment, for accuracy improvement, an average value of plural differences $\Delta A/F_n$ is defined as the variation parameter. In the present embodiment, the difference $\Delta A/F_n$ is integrated for each timing within one engine cycle and a final integration value is divided by the sample number N to find an average value of the differences $\Delta A/F_n$ within one engine cycle. Further, average values of differences $\Delta A/F_n$ corresponding to M engine cycles (for example, M=100) are integrated and a final integration value is divided by the cycle number M to find an average value of the differences $\Delta A/F_n$ within M engine cycles.

As the variation degree in the output of the pre-catalyst sensor is the larger, the average value of the differences $\Delta A/F_n$ within M engine cycles becomes the larger. Therefore, when the average value is equal to or more than a predetermined abnormality determination value, it is determined that the imbalance abnormality occurs, and when the average value is smaller than the predetermined abnormality determination value, it is determined that no imbalance abnormality occurs, that is, the imbalance is normal.

There is a case where the output A/F of the pre-catalyst sensor increases and there is a case where the output A/F of the pre-catalyst sensor decreases. Therefore, the difference $\Delta A/F_n$ or the average value may be found only in one of the cases, which may be used as the variation parameter. Particularly in a case where the air-fuel ratio only in one cylinder is deviated to be rich, when the pre-catalyst sensor receives an exhaust gas corresponding to the one cylinder, since the output thereof quickly changes to a rich side (that is, quickly reduces), it is possible to use a value in the output only in the reducing side for detecting the rich deviation. It should be noted that, not limited thereto, however, it is possible to use a value in the output in the increasing side alone.

Any value correlating with the variation degree in the output of the pre-catalyst sensor can be used as the variation parameter. For example, the variation parameter can be calculated based upon a difference between the maximum value and the minimum value in the output of the pre-catalyst sensor within one engine cycle (so called peak to peak). This is because, as the variation degree in the output of the pre-catalyst sensor is the larger, the difference becomes the larger.

Incidentally in a case of a turbocharged engine equipped with the turbocharger 32 as in the case of the present embodiment, it is found out that the following specific problem occurs at the time of detecting the imbalance abnormality.

First, an exhaust gas is stirred at the time of passing through the turbine 34, particularly a gas remaining in the turbine 34 and a gas newly flowing into the turbine 34 are stirred. Then, the exhaust gases for respective cylinders, finally air-fuel ratios thereof are averaged to reduce the variation in the output of the air-fuel ratio sensor to be small. Therefore, there is the possibility that the imbalance abnormality in the air-fuel ratio can not be accurately detected (first problem).

Second, in a case of the turbocharged engine, there possibly occurs scavenging that intake air blows out into an exhaust side at valve overlapping. That is, at valve overlapping where the intake valve 98 and the exhaust valve 49 are in an opening state, when an intake pressure is higher than an exhaust pressure by supercharging, the intake air, which passes through the intake valve 48 and flows into the combustion chamber 30, passes through the exhaust valve 49 as it is and flows out to the exhaust passage 33. Such passing-straight through or bowing-out of the intake air are called scavenging. In view of the output performance, since the scavenging is used to sweep the gas in the combustion chamber 30, the output improvement can be expected. However, in view of detection of imbalance abnormality in an air-fuel ratio between cylinders, since an air-fuel ratio of the exhaust gas is changed by the blown-out intake air, there is the possibility that the imbalance abnormality in the air-fuel ratio can not be accurately detected (second problem). It should be noted that in a case of a natural intake type engine, even if the valve overlap between the intake valve and the exhaust valve occurs, the scavenging is difficult to occur. This is because the exhaust pressure is usually higher than the intake pressure.

As the solution measure to the first problem, it is considered to perform the imbalance abnormality detection at the opening of the WGV 38. Thereby, the exhaust gas does not pass through the turbine 34 for the bypass and the stirring of the exhaust gas by the turbine 34 is prevented, making it possible to supply the exhaust gas, an air-fuel ratio of which changes for each cylinder, to the air-fuel ratio sensor as it is.

However, according to the above construction, the opportunity of performing the imbalance abnormality detection is limited to the opening time of the WGV 38. Since the WGV 38 is a valve which originally opens for preventing excessive supercharging, an opening region of the WGV 38 is limited to a relatively narrow region in view of an entire engine operating region. Therefore, without taking any measure, the opportunity of performing the imbalance abnormality detection is reduced to be small, thus reducing the detection frequency.

Therefore, for solving the problem specific in the turbocharged engine, the present embodiment adopts a detection method to be in detail described hereinafter.

First Example

Hereinafter, a first example of the imbalance abnormality detection according to the present embodiment will be explained. The first example relates to the first problem.

Figure 6:
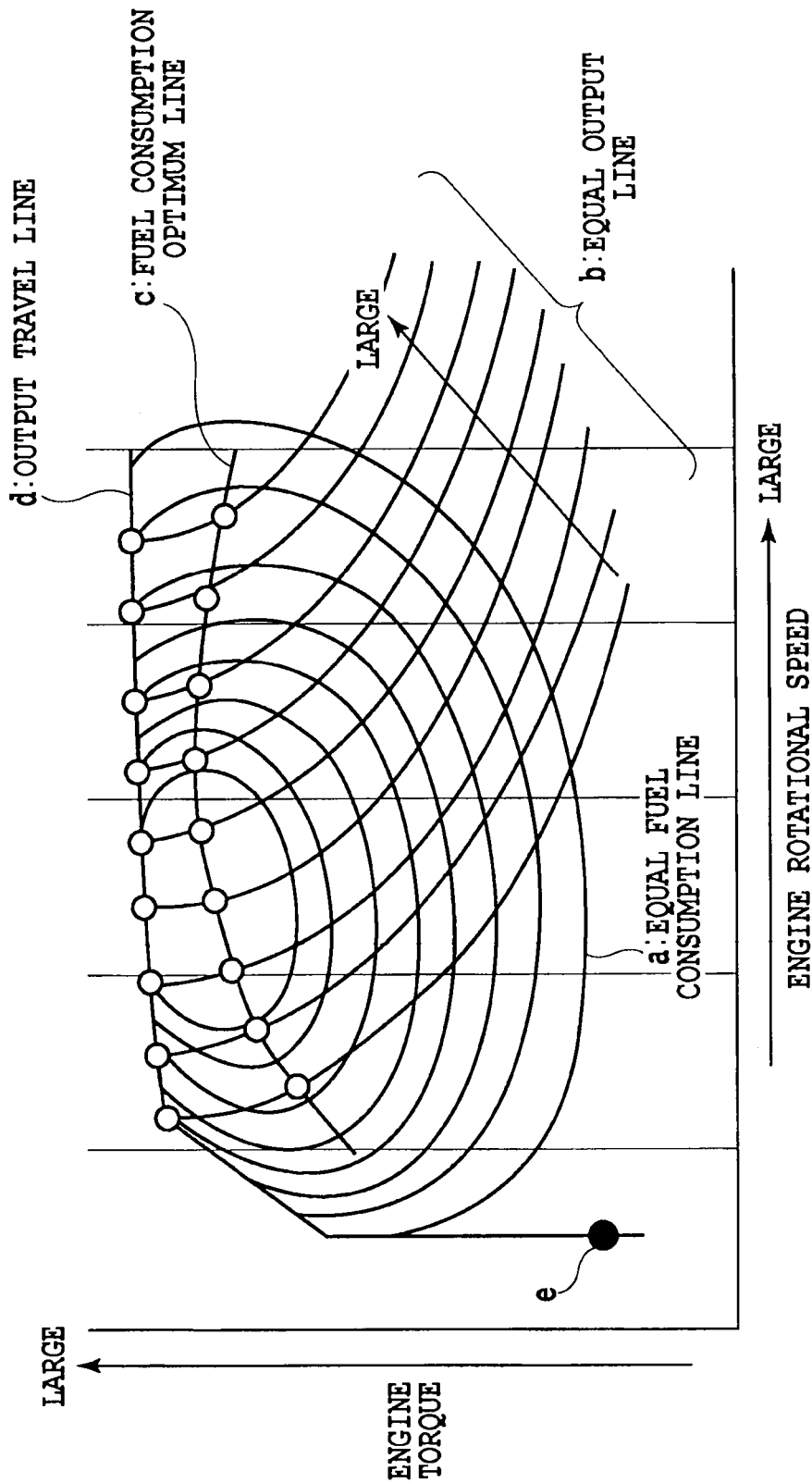
FIG. 6 is a graph showing operating characteristics of an engine in a vehicle.

FIG. 6 shows operation characteristics of an engine in a vehicle in the present embodiment. As shown in the figure, an operation region of the engine is defined by a coordinate system in which engine rotational speeds (rpm) are set as lateral axis and engine torque (Nm) is set as a vertical axis. A plurality of circular lines indicated at a express equal fuel consumption lines, wherein the fuel consumption improves toward a center of a circle. A plurality of oblique lines indicated at b express equal output lines in regard to engine output, wherein the output increases toward the top and right side. It should be noted that, since the toque corresponds to force and the output corresponds to a work load per unit time, the output increases as the rotational speed is the higher even with constant torque. At e is indicated an idle point.

According to vehicle control in the present embodiment, the engine 1 and the CVT 11 are controlled in such a manner that a plurality of operation lines in the coordinate system are in advance stored in the ECU 100, one of the operation lines is selected in response to an accelerator opening degree detected by the accelerator opening degree sensor 64, that is, an output requirement, and an actual operation point of the engine moves on the selected operation line. Here, the actual operation point is a point in the coordinate system expressed by a set of an actual rotational speed and torque of the engine.

A typical example of the operation line is a fuel consumption optimum line which is indicated at c in FIG. 6 and in which the fuel consumption is optimal. The fuel consumption optimum line c exists in a high torque region of the engine. The engine 1 and the CVT 11 are controlled in such a manner that in a regular travel, the actual operation point moves on the fuel consumption optimum line c.

A different example of the operation line is a travel output line which is indicated at d in FIG. 6 and in which the maximum torque for each rotation is obtained. The engine 1 and the CVT 11 are controlled in such a manner that in a case where an output requirement of a full accelerator opening degree is made, the actual operation point moves on the travel output line d.

In the present embodiment, the engine rotational speed can be controlled to a desired value by controlling a gear ratio of the CVT 11 to the output requirement and the engine torque can be controlled to a desired value by controlling a throttle valve to the output requirement.

Figure 7:
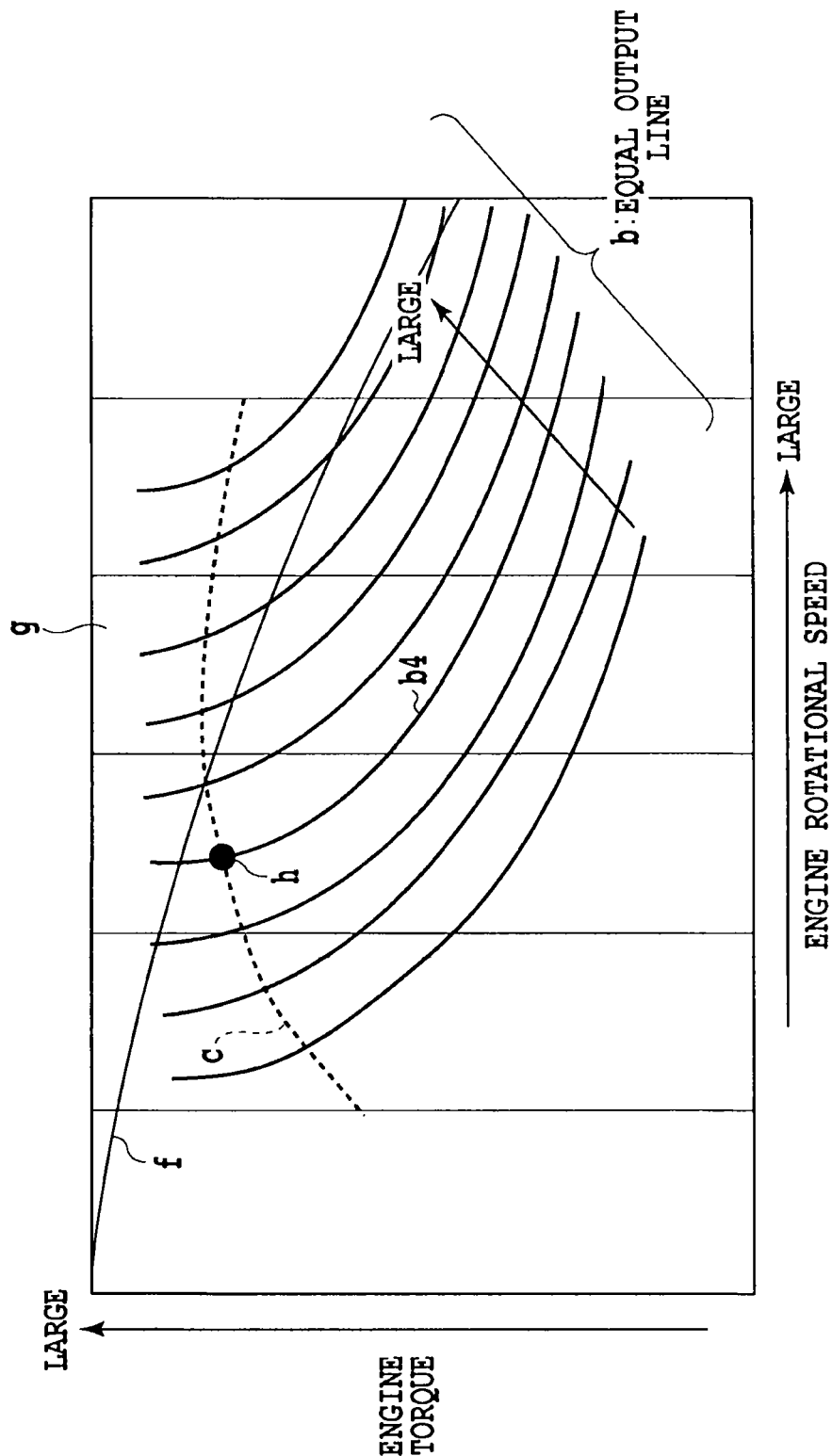
FIG. 7 is a graph showing an actual operation in a first example and shows a state before changing an operation line.

FIG. 7 shows a diagram similar to FIG. 6. Here, for simplification, the equal fuel consumption optimum line a, the idle point e, and the travel output line d are omitted. The fuel consumption optimum line c is drawn in a broken line. A region g in the side of higher rotation and higher torque from a boundary line f is a WGV opening region, wherein the WGV 38 is controlled to be opened within the WGV opening region g, and the WGV 38 is controlled to be closed out of the region g.

Now, assuming that an actual operation point h is on a fuel consumption optimum line c and is on an equal output line b4, since the WGV 38 is closed at this time, if the imbalance abnormality detection is performed, there is the possibility that the imbalance abnormality detection is deteriorated in accuracy due to the stirring of the exhaust gas by the aforementioned turbine 34.

Figure 8:
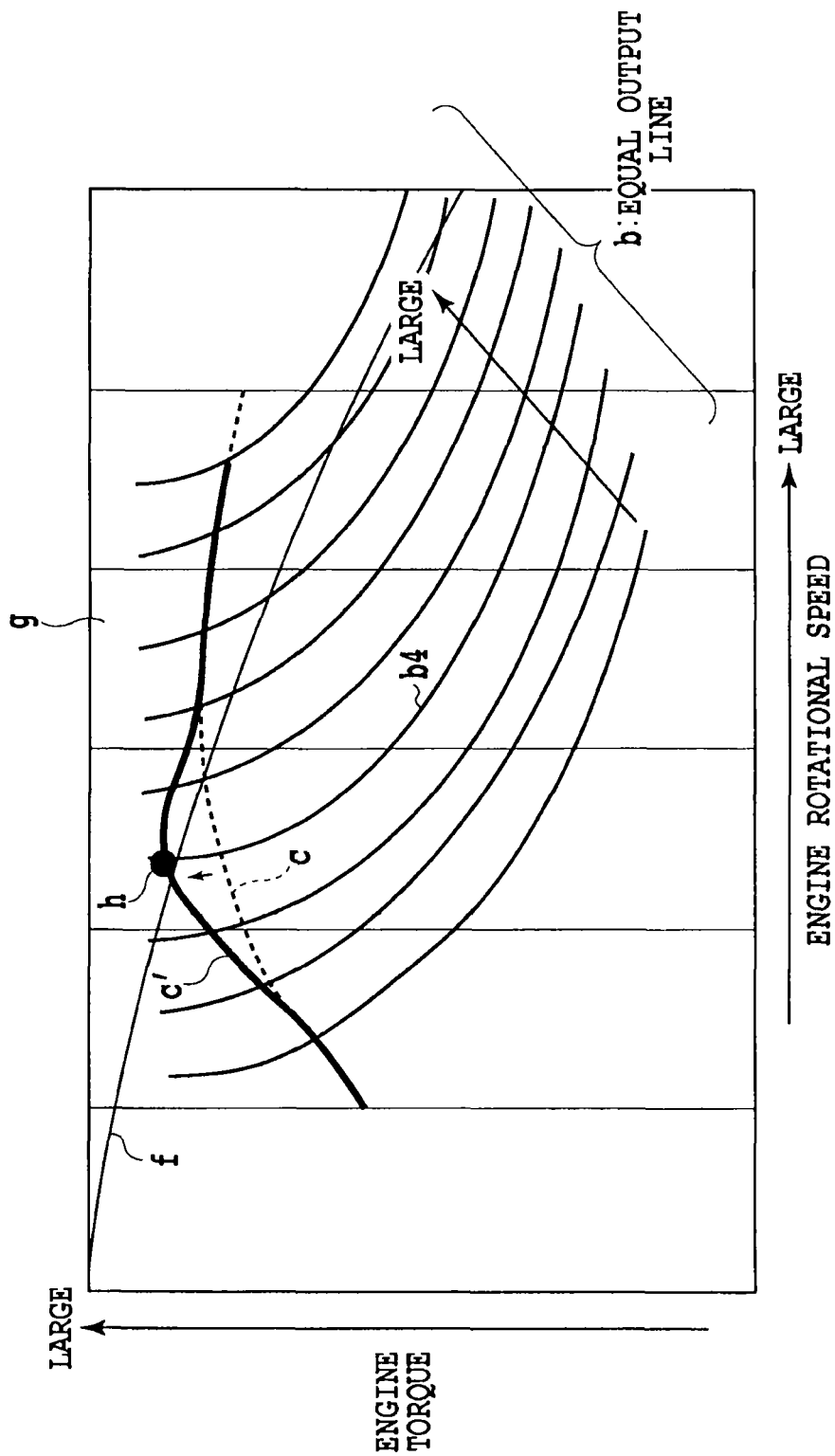
FIG. 8 is a graph showing an actual operation in the first example and shows a state after changing the operation line.

Therefore, when the imbalance abnormality detection is performed in this case, as shown in FIG. 8, the fuel consumption optimum line is changed from c (broken line) to c' (solid line) in the side of higher torque. That is, when the actual operation point h is out of the WGV opening region g at the time of detecting the imbalance abnormality, the operation line (fuel consumption optimum line) is changed in such a manner that the actual operation point h moves into the WGV opening region g. Particularly the operation line is changed in such a manner that the actual operation point h moves into the WGV opening region g on the same equal output line b4.

In consequence, caused by the change of the operation line, the actual operation point h can move into the WGV opening region g and the imbalance abnormality detection can be performed in a state where the WGV 38 opens, thus solving the above problem and accurately performing the imbalance abnormality detection.

In addition, since the operation line is changed in such a manner that the actual operation point h moves into the WGV opening region g on the same equal output line b4, the engine output can be made to be equal before and after the change to maintain the same vehicle speed.

Here, as an actuator 39 for opening/closing the WGV 38 in the present embodiment, a mechanical type actuator of deforming a diaphragm in response to an intake pressure for driving is adopted. The aforementioned WGV opening region g is in advance found by experiments and is in advance stored in a map defined by the rotational speed and torque shown in FIG. 7. By comparing the WGV opening region g on the map with the actual operation point h, it is determined whether or not the operation line is changed. In a case of changing the operation line, the operation line is changed at least as much as the actual operation point h enters into the WGV opening region g over a boundary line f.

By making such a change, even in a case where the actual operation point h is originally out of the WGV opening region g, the imbalance abnormality detection can be performed, thus substantially enlarging the WGV opening region and increasing frequency of the imbalance abnormality detection.

It should be noted that, since the WGV 38 opens for preventing the excessive supercharging and beforehand the engine damage, the WGV 38 can not be forcibly closed within the WGV opening region g as shown in the figure. On the other hand, when the WGV 38 originally closes, it is possible to open the WGV 38. However, in this case, there is the possibility that the supercharging is lowered to lower the engine pressure. Therefore, for preventing this problem, two kinds of engine control maps for a case of not changing opening/closing characteristics of the WGV and for a case of changing it are in advance prepared. The maps may be switched in accordance with presence/absence of the change to compensate for an output reduction at the changing. That is, the engine control characteristic may be changed in response to the change of the opening/closing characteristic of the WGV.

Figure 9:
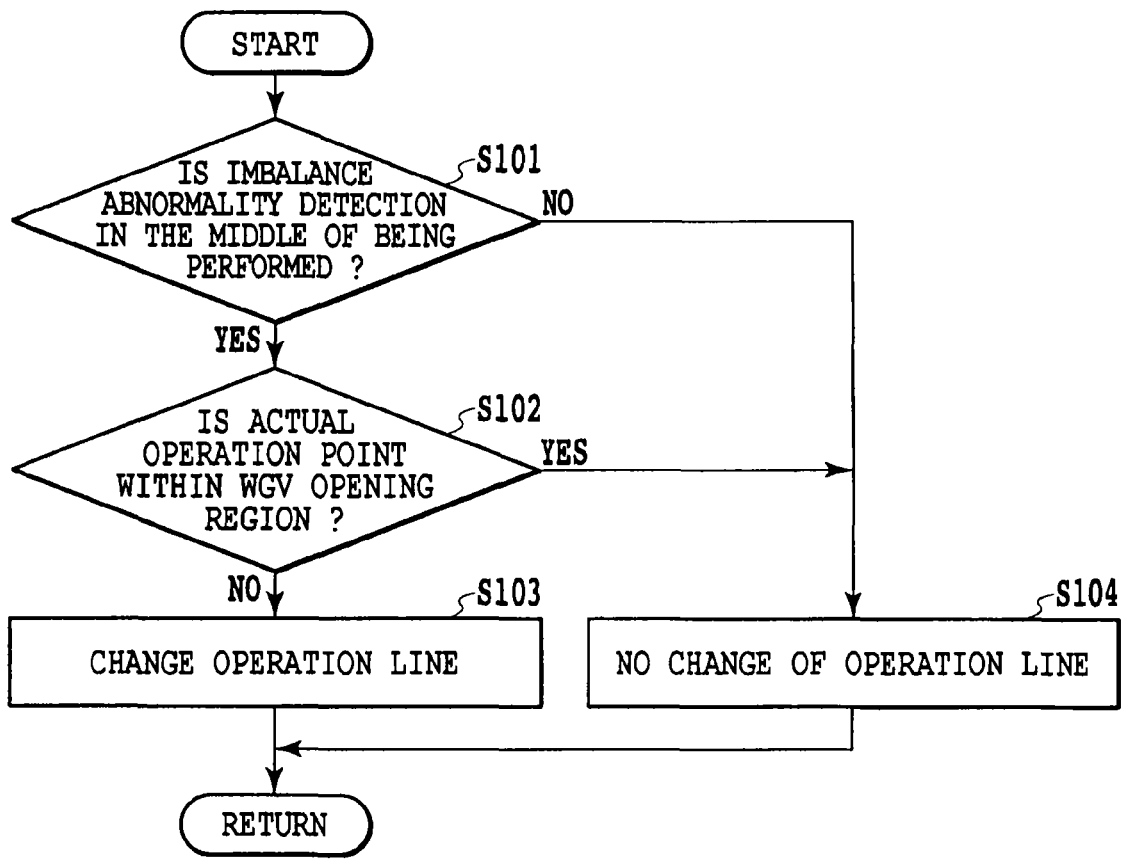
FIG. 9 is a flow chart showing an imbalance abnormality detecting routine according to the first example.

Next, by referring to FIG. 9, an imbalance abnormality detection routine according to the first example will be explained. The routine can be repeatedly executed, for example, for each time of the sample cycle τ by the ECU 20.

First, at step S101, it is determined whether or not the imbalance abnormality detection is in the middle of being performed. The imbalance abnormality detection is performed when a predetermined precondition is established, and the precondition is established when the following condition is established.

(1) Warming-up of an engine is completed. For example, when a temperature detected by the water temperature sensor 65 is equal to or more than a predetermined value, it is determined that the warming-up is completed.
(2) At least the pre-catalyst sensor 60 is activated.
(3) In the middle of the stoichiometric air-fuel ratio control.
(4) An intake air quantity Ga is equal to or more than a predetermined value.

The condition of (4) is provided for ensuring appropriate collision of gases with the pre-catalyst sensor 60. It is preferable to include a condition that the engine is during a steady operation, but may not necessarily include it. The precondition can be changed as needed.

When the imbalance abnormality detection is in the middle of being performed, the process goes to step S102, wherein it is determined that the actual operation point is within the WGV opening region.

When the actual operation point is not within the WGV opening region, the process goes to step S103, wherein the operation line (for example, fuel consumption optimum line c) is changed as described above. In consequence, the actual operation point can move into the WGV opening region on the same equal output line to perform the imbalance abnormality detection in a state of WGV opening while maintaining the same vehicle speed.

On the other hand, when the actual operation point is within the WGV opening region, the process goes to step S104, the operation line is not changed. In consequence, the actual operation point can move on a regular or existing operation line and the imbalance abnormality detection can be performed in a state of the WGV opening in the middle of the moving. It should be noted that, also when it is determined at step S101 that the imbalance abnormality detection is not in the middle of being performed, the process goes to step S104.

When the operation line is changed, after the imbalance abnormality detection is completed, the operation line is also returned to a regular operation line. The operation line is not limited to the fuel consumption optimum line c, and may be an arbitrary operation line.

Second Example

Next, a second example of the imbalance abnormality detection according to the present embodiment will be explained. The second example relates to the second problem.

Figure 10:
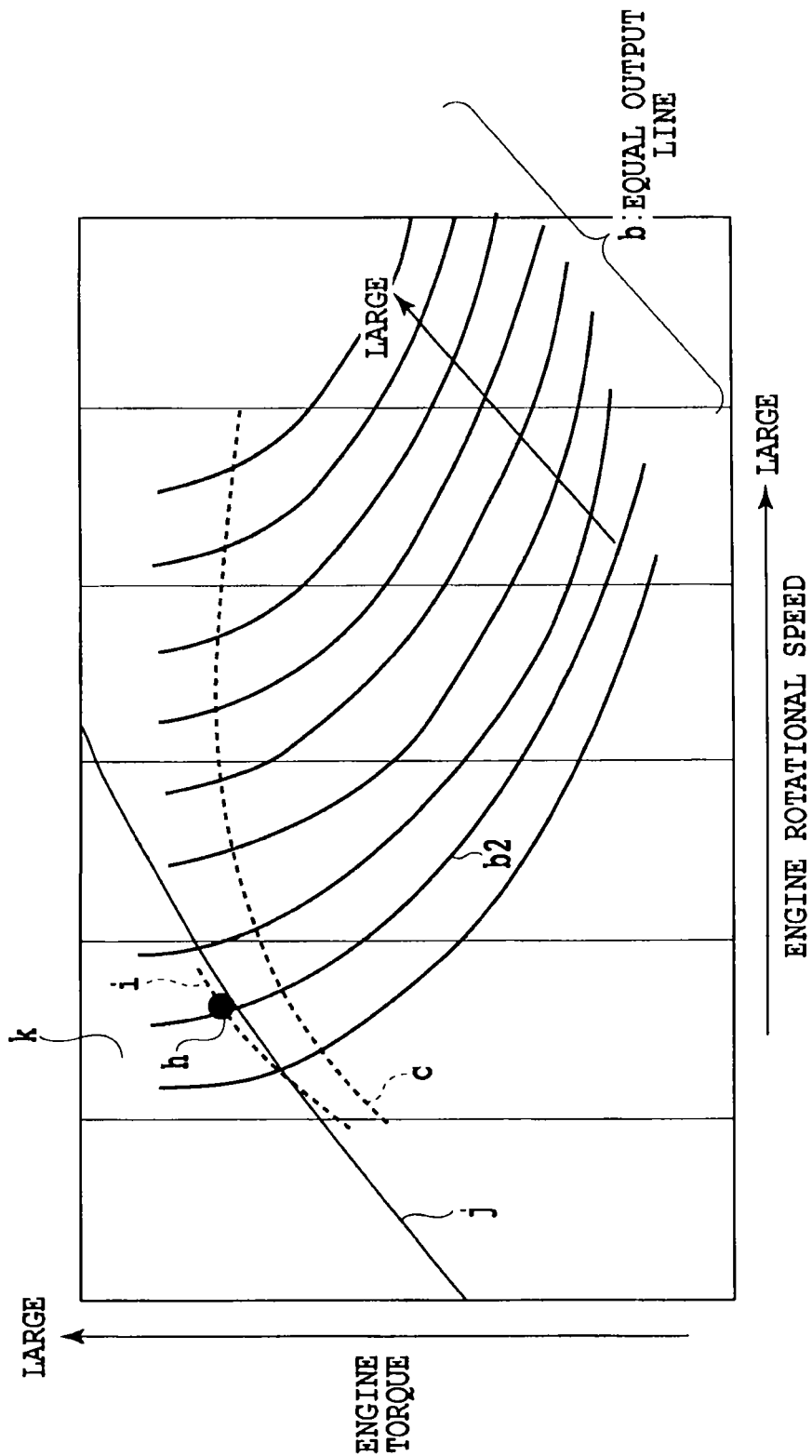
FIG. 10 is a graph showing an actual operation in a second example and shows a state before changing an operation line.

FIG. 10 shows a diagram similar to FIG. 7. However, a scavenging region k and a boundary line j thereof are drawn instead of the WGV opening region g and the boundary line f. For reference, the fuel consumption optimum line c is drawn in a broken line, but here, an actual operation point h is controlled to move on a different operation line i at the higher torque side.

The scavenging region k is in advance found by experiments and is in advance stored in a map defined by the rotational speed and torque as shown in FIG. 10. The aforementioned scavenging occurs within the scavenging region k. The scavenging region k exits in the side of the low rotational speed and the high torque.

As shown in FIG. 10, it is assumed that the actual operation point h is on the operation line i and on an equal output line b2 within the scavenging region k. Since the scavenging occurs at this time, if the imbalance abnormality detection is performed at this time, there is the possibility of being incapable of maintaining accuracy of the imbalance abnormality detection due to the blow out of the intake air to the exhaust side.

Figure 11:
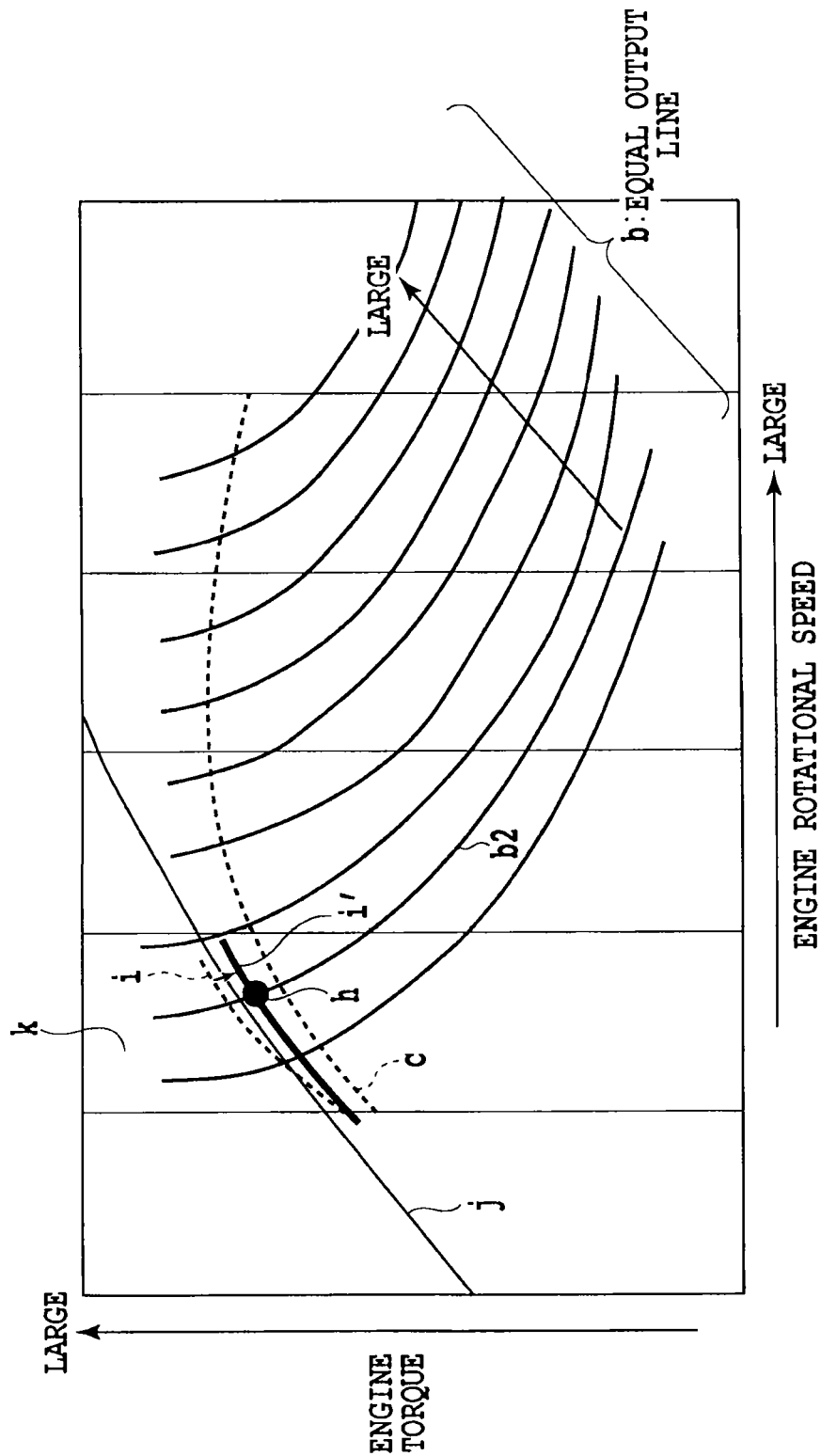
FIG. 11 is a graph showing an actual operation in the second example and shows a state after changing the operating line.

Therefore, when the imbalance abnormality detection is performed in this case, as shown in FIG. 11, the operation line is changed from i (broken line) to i' (solid line) in the side of lower torque. That is, when the actual operation point h is within the scavenging region k at the time of detecting the imbalance abnormality, the operation line is changed in such a manner that the actual operation point h moves out of the scavenging region k. Particularly the operation line is changed in such a manner that the actual operation point h moves out of the scavenging region k on the same equal output line b2.

In consequence, the actual operation point h can move out of the scavenging region k caused by the change of the operation line, and the imbalance abnormality detection can be performed in a state where the scavenging does not occur to solve the above problem, thus accurately performing the imbalance abnormality detection.

In addition, since the operation line is changed in such a manner that the actual operation point h moves out of the scavenging region k on the same equal output line b2, the engine output can be made to be equal before and after the change to maintain the same vehicle speed.

By comparing the scavenging region k on the map with the actual operation point h, it is determined whether or not the operation line is changed. In a case of changing the operation line, the operation line is changed at least as much as the actual operation point h is out of the scavenging region k over a boundary line j.

By making such a change, even in a case where the actual operation point h is originally within the scavenging region k, the imbalance abnormality detection can be performed, thus substantially reducing the scavenging region and increasing frequency of the imbalance abnormality detection.

It should be noted that, as similar to the previous description, two kinds of engine control maps are in advance prepared for cases of not changing and changing the operation line. The maps may be switched in accordance with presence/absence of the change to compensate for an output change at the changing.

In the above construction, the explanation is made of a case where the actual operation point h exists on the operation line i different from the fuel consumption optimum line c. However, in a case where at least a part of the fuel consumption optimum line c is positioned within the scavenging region k, the fuel consumption optimum line c may be changed in such a manner that the actual operation point h on the above part moves out of the scavenging region k.

Figure 12:
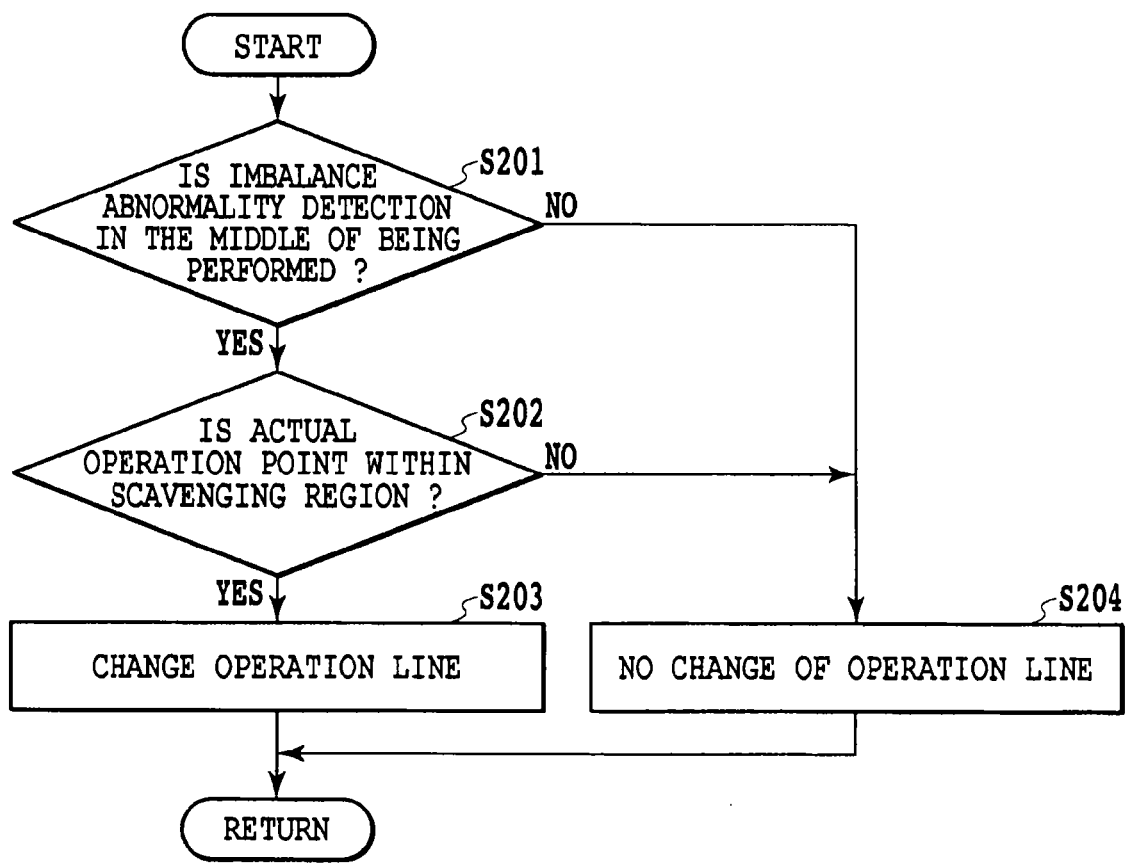
FIG. 12 is a flow chart showing an imbalance abnormality detecting routine according to the second example.

Next, by referring to FIG. 12, an imbalance abnormality detection routine according to the second example will be explained. The routine can be repeatedly executed, for example, for each time of the sample cycle T by the ECU 20.

First, at step S201, it is determined whether or not the imbalance abnormality detection is in the middle of being performed, as similar to step S101.

When the imbalance abnormality detection is in the middle of being performed, the process goes to step S202, wherein it is determined whether or not the actual operation point is within the scavenging region.

When the actual operation point is within the scavenging region, the process goes to step S203, wherein the operation line (for example, operation line i) is changed as described above. In consequence, the actual operation point can move out of the scavenging region on the same equal output line to perform the imbalance abnormality detection in a state of no scavenging while maintaining the same vehicle speed.

On the other hand, when the actual operation point is not within the scavenging region, the process goes to step S204, the operation line is not changed. In consequence, the actual operation point can move on a regular or existing operation line to perform the imbalance abnormality detection in a state of no scavenging in the middle of the moving. It should be noted that, also when it is determined at step S101 that the imbalance abnormality detection is not in the middle of being performed, the process goes to step S204.

Next, a modification of the second example will be explained.

As described above, in a case where the imbalance abnormality detection is performed when the actual operation point h is within the scavenging region k, there is the possibility that accurate imbalance abnormality detection can not be performed. On the other hand, the scavenging occurs only when overlap between intake and exhaust valves exists, and such overlap exists within the scavenging region k without mentioning.

Therefore, according to the modification, when the actual operation point h is within the scavenging region k at the time of detecting the imbalance abnormality, valve timing is changed to prohibit valve overlap between the intake valve 48 and the exhaust valve 49. This change is made by controlling the VVT 50 by the ECU 100.

In consequence, the occurrence of the scavenging can be prevented and the imbalance abnormality detection can be performed in a state where the scavenging does not occur to solve the above problem, thus accurately performing the imbalance abnormality detection.

Figure 13:
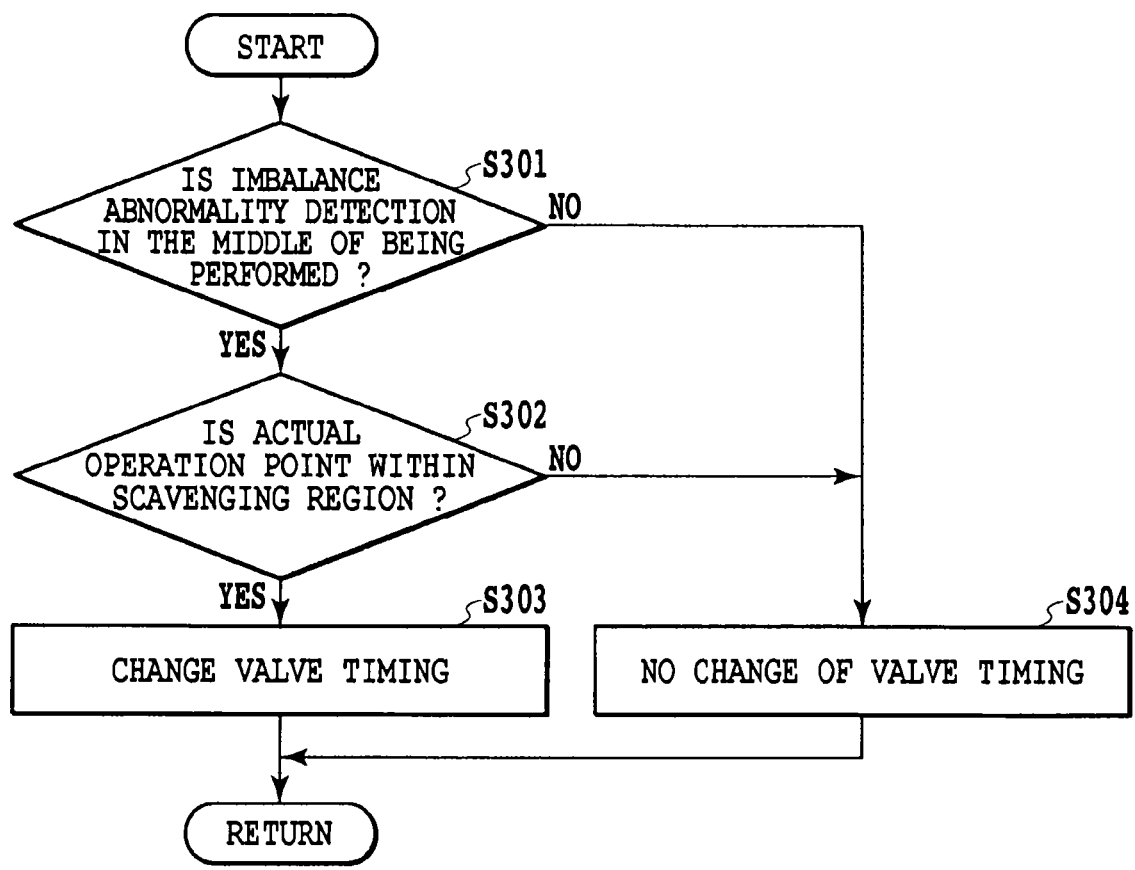
FIG. 13 is a flow chart showing an imbalance abnormality detecting routine according to a modification of the second example.

Next, by referring to FIG. 13, an imbalance abnormality detection routine according to the modification in the second example will be explained. The routine can be repeatedly executed, for example, for each time of the sample cycle τ by the ECU 20.

At step S301 and step S302 are similar to step S201 and step S202. In a case where it is determined at step S302 that the actual operation point is within the scavenging region, the process goes to step S303, wherein the valve timing is changed to prohibit the valve overlap. In consequence, the imbalance abnormality detection can be performed in a state of no scavenging.

On the other hand, in a case where it is determined at step S302 that the actual operation point is out of the scavenging region, the valve timing is not changed. In consequence, the valve timing is made to be a regular or existing valve timing, and the imbalance abnormality detection is performed in a state of no scavenging. It should be noted that, also when it is determined at step S301 that the imbalance abnormality detection is not in the middle of being performed, the process goes to step S304.

As described above, the preferred embodiments in the present invention are in detail explained, and examples of the embodiment in the present invention may include other various types. For example, the present invention may be applied to a hybrid vehicle in which an internal combustion engine and an electric motor as two power sources are coupled via a stepless transmission to drive wheels. In such a hybrid vehicle, an engine rotational speed can be controlled to a desired value by controlling a motor rotational speed.

The internal combustion engine to which the present invention can be applied is not limited to the aforementioned one, but as long as the internal combustion engine is a multi-cylinder internal combustion engine, the cylinder number, the form, and the application and the like thereof are not limited particularly. In a case of a spark ignition internal combustion engine, alternative fuel (gas fuel such as alcohol and CNG) may be used.

The embodiment in the present invention is not limited to the aforementioned embodiments, but the present invention includes all modifications, applications and the equivalents contained in the spirit of the present invention as defined in claims. Therefore, the present invention should not be interpreted in a limited manner and can be applied to any other technologies contained within the scope of the spirit of the present invention.

The invention claimed is:

1. An apparatus for detecting imbalance abnormality in an air-fuel ratio between cylinders comprising:
    a turbine of a turbocharger disposed in an exhaust passage in a multi-cylinder internal combustion engine;
    a waist gate valve for opening/closing a bypass passage bypassing the turbine;
    an air-fuel ratio sensor disposed in the exhaust passage downstream of an outlet of the bypass passage;
    abnormality detecting means for detecting imbalance abnormality in an air-fuel ratio between cylinders based upon a variation degree in output of the air-fuel ratio sensor;
    a stepless transmission connected to the internal combustion engine;
    control means for controlling the internal combustion engine and the stepless transmission in such a manner that an actual operation point of the internal combustion engine moves on a predetermined operation line in a coordinate system defined by an engine rotational speed and engine torque; and
    changing means for changing the operation line in such a manner that, when the actual operation point is outside of a waist gate valve opening region in the coordinate system at the time of detecting the imbalance abnormality, the actual operation point moves into the waist gate valve opening region.

2. An apparatus for detecting imbalance abnormality in an air-fuel ratio between cylinders according to claim 1, wherein
    the changing means changes the operating line in such a manner that the actual operating point moves into the waist gate valve opening region on the same equal output line in the coordinate system.

3. An apparatus for detecting imbalance abnormality in an air-fuel ratio between cylinders according to claim 1, wherein
    the operating line is a fuel consumption optimum line in which the fuel consumption is optimal.

4. An apparatus for detecting imbalance abnormality in an air-fuel ratio between cylinders according to claim 1, wherein
    the abnormality detecting means detects the imbalance abnormality based upon a value of a parameter correlating with a variation degree in the output of the air-fuel ratio sensor, and
    the parameter is a value based upon a difference in the output of the air-fuel ratio sensor between two different timings.

5. An apparatus for detecting imbalance abnormality in an air-fuel ratio between cylinders according to claim 1, wherein
    the air-fuel ratio sensor is disposed in a collector, in which exhaust gases of the respective cylinders collect, in the exhaust passage.

6. An apparatus for detecting imbalance abnormality in an air-fuel ratio between cylinders comprising:
    a turbine of a turbocharger disposed in an exhaust passage in a multi-cylinder internal combustion;
    an air-fuel ratio sensor disposed in the exhaust passage downstream of the turbine;
    abnormality detecting means for detecting imbalance abnormality in an air-fuel ratio between cylinders based upon a variation degree in output of the air-fuel ratio sensor;
    a stepless transmission connected to the internal combustion engine;
    control means for controlling the internal combustion engine and the stepless transmission in such a manner that an actual operation point of the internal combustion engine moves on a predetermined operation line in a coordinate system defined by an engine rotational speed and engine torque; and
    changing means for changing the operation line in such a manner that, when the actual operation point is within a scavenging region in the coordinate system at the time of detecting the imbalance abnormality, the actual operation point moves out of the scavenging region.

7. An apparatus for detecting imbalance abnormality in an air-fuel ratio between cylinders according to claim 6, wherein
    the changing means changes the operation line in such a manner that the actual operation point moves out of the scavenging region on the same equal output line in the coordinate system.

8. An apparatus for detecting imbalance abnormality in an air-fuel ratio between cylinders comprising:
    a turbine of a turbocharger disposed in an exhaust passage in a multi-cylinder internal combustion;
    an air-fuel ratio sensor disposed in the exhaust passage downstream of the turbine;
    abnormality detecting means for detecting imbalance abnormality in an air-fuel ratio between cylinders based upon a variation degree in output of the air-fuel ratio sensor;
    a stepless transmission connected to the internal combustion engine;
    control means for controlling the internal combustion engine and the stepless transmission in such a manner that an actual operation point of the internal combustion engine moves on a predetermined operation line in a coordinate system defined by an engine rotational speed and engine torque; and
    changing means for changing valve timing in such a manner that valve overlap between an intake valve and an exhaust valve is prohibited when the actual operation point is within a scavenging region in the coordinate system at the time of detecting the imbalance abnormality.

\* \* \* \* \*